United States Patent

Inoguchi et al.

[11] Patent Number: 5,965,981
[45] Date of Patent: Oct. 12, 1999

[54] TRANSPARENT THIN-FILM EL DISPLAY APPARATUS

[75] Inventors: Kazuhiro Inoguchi, Toyota; Tomoya Uchida, Kariya; Nobuei Ito, Chiryu; Tadashi Hattori, Okazaki, all of Japan

[73] Assignee: Nippondenso Co., LTD, Kariya, Japan

[21] Appl. No.: 09/014,678

[22] Filed: Jan. 28, 1998

Related U.S. Application Data

[62] Division of application No. 08/489,157, Jun. 9, 1995, Pat. No. 5,757,127.

[30] Foreign Application Priority Data

| Jun. 10, 1994 | [JP] | Japan | 6-152954 |
| Sep. 6, 1994 | [JP] | Japan | 6-212653 |
| Mar. 31, 1995 | [JP] | Japan | 7-100157 |

[51] Int. Cl.⁶ .................... H05B 33/14
[52] U.S. Cl. ............. 313/506; 313/509; 313/503
[58] Field of Search .................. 313/506, 507, 313/509, 510, 513, 117, 111

[56] References Cited

U.S. PATENT DOCUMENTS

| 4,357,557 | 11/1982 | Inohara et al. . |  |
| 4,645,970 | 2/1987 | Murphy . |  |
| 4,808,978 | 2/1989 | Vernay | 340/705 |
| 4,945,009 | 7/1990 | Taguchi et al. | 428/690 |
| 4,954,746 | 9/1990 | Taniguchi et al. | 313/506 |
| 4,963,788 | 10/1990 | King et al. | 313/503 |
| 5,070,323 | 12/1991 | Iino et al. | 340/705 |
| 5,084,650 | 1/1992 | Ryu | 313/507 |
| 5,188,901 | 2/1993 | Shimizu | 428/421 |
| 5,194,777 | 3/1993 | Nakaya et al. | 313/509 |
| 5,476,727 | 12/1995 | Maruta | 428/690 |
| 5,504,387 | 4/1996 | Dickey . |  |
| 5,504,389 | 4/1996 | Dickey | 313/506 |
| 5,757,127 | 5/1998 | Inoguchi et al. | 313/507 |

FOREIGN PATENT DOCUMENTS

| 62-200681 | 9/1987 | Japan . |
| 62-200682 | 9/1987 | Japan . |
| 62-202492 | 9/1987 | Japan . |
| 62-273117 | 11/1987 | Japan . |
| 63-1440 | 1/1988 | Japan . |
| 63-48589 | 3/1988 | Japan . |
| 63-114794 | 5/1988 | Japan . |
| 63-116393 | 5/1988 | Japan . |
| 1149397 | 6/1989 | Japan . |
| 1302384 | 12/1989 | Japan . |
| 317437 | 4/1991 | Japan . |
| 3222287 | 10/1991 | Japan . |
| 5347186 | 12/1993 | Japan . |

OTHER PUBLICATIONS

Chase et al., "Electroluminescence of ZnS Lumocen Devices Containing Rare–Earth and Transition–Metal Fluorides", Journal of Applied Physics, vol. 40, No. 6, May 1969, pp. 2512–2519.

(List continued on next page.)

Primary Examiner—Vip Patel
Assistant Examiner—Matthew J. Gerike
Attorney, Agent, or Firm—Pillsbury Madison & Sutro, LLP

[57] ABSTRACT

A transparent thin-film EL display apparatus has a transparent thin-film EL element formed on a glass substrate. A rear substrate consisting of photochromic glass and the glass substrate on which the EL element is formed are disposed facing each other with the EL element located in between. A light-transmitting insulation material is inserted in a space between the two substrates and hermetically sealed. When the display on the EL element becomes hard to see due to light entering from the rear of the display apparatus, the photochromic glass reacts in response to the light and darkens the rear of the EL element, thereby blocking the light. Accordingly, normally the display apparatus displays various items of information through the front substrate and ensures visibility of the background through the display apparatus, and when high-intensity external light enters through the rear, the display apparatus reacts and blocks this light by means of a light shutter function, thereby enabling reliable display of the information without impairment of display contrast, thus guaranteeing a stable and highly reliable display.

9 Claims, 14 Drawing Sheets

OTHER PUBLICATIONS

Hanaki et al., "A Semi–Transparent Solar Cell Using a–SiC", Materials Research Society Symposium Proc., vol. 149, 1989.

"An Outline of Optics I", Asakura Shoten, Feb. 25, 1979, pp. 50–57.

Nikkei electronics Aug. 1982, pp. 89–104.

The Photonics Design & Applications Handbook, 34th Ed., 1988, p. H–288.

A Semi–Transparent Solar Cell Using a–SiC Active Layer by H. Nakabayashi et al., Technical Digest of the International PVSEC–3.701; pp. 71–74.

⇩ EL DISPLAY LIGHT

TRANSPARENT THIN-FILM EL DISPLAY APPARATUS

This is a division of application Ser. No. 08/489,157, filed Jun. 9, 1995, now U.S. Pat. No. 5,757,127.

CROSS REFERENCE TO RELATED APPLICATION

This application is based upon and claims the benefit of priority of the prior Japanese Patent applications No. 6-152954 filed on Jun. 10, 1994, No. 6-212653 filed on Sep. 6, 1994, and No. 7-100157 filed on Mar. 31, 1995, the contents of which are incorporated herein by reference.

BACKGROUND OF THE INVENTION

1. Field of the Invention

The present invention relates to an EL (electroluminescent) display apparatus which is used as a display apparatus for various information terminal devices, inboard aircraft displays, inboard vehicle displays, etc., and more particularly to a transparent thin-film EL display apparatus enabling visual recognition of a background therethrough.

2. Related Arts

An EL display apparatus is a type of display apparatus which utilizes the phenomenon that luminescence occurs in a luminescent substance, based on zinc sulfide (ZnS) or the like as a host material, when an electric field is applied thereto. This type of display unit has drawn attention as a self-luminescence type planar display apparatus. Typically, an EL element obtained by sequentially laminating a first electrode, a first insulation layer, a luminescent layer, a second insulation layer, and a second electrode in the order mentioned is formed on a retaining substrate and this EL element is hermetically sealed by a protective substrate. Further, the color of the luminescence emitted therefrom can be variously changed according to the type of luminescence center element added to the luminescent layer. For example, the EL element emits an amber color by adding manganese (Mn) to the luminescent layer with ZnS used as the host material thereof, and emits green, red, blue, and white colors by respectively adding terbium fluoride ($TbF_3$), samarium chloride ($SmCl_3$), thulium chloride ($TmCl_3$), and praseodymium fluoride ($PrF_3$).

Among the EL display apparatuses constructed as described above, a transparent thin-film EL display apparatus in which the retaining substrate, EL element, and protecting substrate are each composed of transparent material is disclosed in "Nikkei Electronics" (p. 98, FIG. 9), published Aug. 16, 1982. By mounting such a transparent thin-film EL display apparatus on the dashboard of an automobile, it was expected that using it as a transmission type display apparatus would enable the driver to visually recognize displayed information such as speed etc. while directing his line of sight toward the front of the automobile to drive, and in addition would not become an obstacle to the driver's forward field of vision. In view of this, in order to enhance forward visibility, a technique has been proposed to provide an antireflection film on the protective substrate (transparent rear substrate) located on the rear of the transparent thin-film EL display apparatus so as to enable clear visibility of an object to be observed located at the rear of the transparent thin-film EL display apparatus, i.e. located at the front through this display apparatus.

However, in a case where the EL display apparatus is used as a heads-up display in a vehicle as mentioned above, early morning sunlight or late afternoon sunlight, when the altitude of the sun is relatively low, may enter from the rear side of the display apparatus. In addition, where light is incident through the rear side of the transparent thin-film EL display apparatus, there is the problem that the displayed information on the EL display apparatus is hard to see. For this reason, it is necessary for the visibility of the front view viewed through the EL display apparatus and the clarity of the display to be compatible.

Enhancing the contrast of the display has been considered as one technique for improving the clarity of the display. In order to enhance the contrast of the display of the transparent thin-film EL display apparatus, methods such as adhering a black vinyl sheet or the like onto the transparent rear plane substrate or applying a color coating material to the substrate are known. Further, in Japanese Examined Patent Publication No. 58-55634, a technique of including a color dye in a protective injection fluid of the thin-film EL element has been proposed.

However, the above-mentioned techniques for enhancing the contrast of the display sacrifice transparency, which is the most significant feature of the transparent thin-film EL display apparatus. Namely, the use of such techniques results in the deterioration of forward visibility through the EL display apparatus.

SUMMARY OF THE INVENTION

An object of the present invention is to provide a transparent thin-film EL display apparatus with enhanced contrast and good forward visibility through the EL display apparatus.

In other words, the present invention is constructed such that even when external light is incident from the rear of the EL display apparatus, the contrast of the display can be ensured while ensuring normal visibility of the background viewed through the EL display apparatus.

To this end, the present invention is characterized in that, in a transmission type display apparatus (e.g., transparent thin-film EL display apparatus) comprising a self-luminescent element (e.g., transparent thin-film EL element) formed of a transparent material, a retaining member formed of a transparent material and used for retaining the self-luminescent element, and a protective member formed of a transparent material and disposed so as to seal the self-luminescent element together with the retaining member, an optical component, which changes color thereof so that light transmittance decreases when the intensity of light incident from the rear of the display apparatus is high, is disposed further towards the rear than at least the self-luminescent element.

More specifically, the present invention provides at least one transparent thin-film EL display apparatus, wherein a thin-film EL element having at least a luminescent layer comprising a luminescent substance and a transparent insulation layer disposed between a pair of transparent electrodes, within a housing composed of a light-transmitting front substrate and a light-transmitting rear substrate, the transparent thin-film EL display apparatus being characterized in that an optical component exhibiting a reversible change in light transmittance according to the intensity of external light incident through the rear substrate side is disposed on a side more rear toward the rear substrate than the thin film EL element. The optical component exhibiting a reversible change in light transmittance may be made of a photochromic compound which upon receipt of light darkens and upon suspension of light irradiation discolors and is restored to its original colorless or transparent colorable condition, specifically, the rear surface substrate may be formed of photochromic glass.

As another structural example of the optical component exhibiting a reversible change in light transmittance, the optical component can be formed by an external light sensor means for sensing external light incident from the rear surface and an electro-optical display which has a light shutter function. As one example of an electro-optical display having a light shutter function there is a liquid crystal display, electrochromic display, or the like. Further, as the external light sensor means for sensing external light incident from the rear there can be used a CdS, PIN photodiode, etc. However, by using a solar cell, it is possible not only to sense the intensity (brightness) of the external light but also to operate the electro-optical display with the use of power generated according to the intensity of the external light. Further, regarding incident light such as an indoor illuminator lamp which is incident from the front surface side of the display apparatus, an antireflection film or an antiglare film (or antiglare sheet) may be disposed on the front surface of the light-transmitting front substrate so as to further improve the contrast of the display.

Additionally, in the above-mentioned transparent thin-film EL display apparatus, it is desirable that when the effect of external light is small (in the case of normal use), the display apparatus has a light transmittance of more than 60% or preferably more than 70%, while on the other hand, when the effect of external light is great, it has a light transmittance of 70% or less or preferably 60% or less.

By constructing the thin-film EL display apparatus as described above, since the optical component is normally transparent, the display apparatus performs various information display functions through the front substrate and can also ensure visibility of the background viewed through the display apparatus. On the other hand, when high-intensity external light enters from the rear, the optical component perceives this and decreases light transmittance so as to exclude this, so that reliable information display operation can be performed without impairing the contrast of the display. Accordingly, even when the thin-film EL display apparatus is mounted in a vehicle, aircraft, or the like, stable and highly reliable display is ensured. Further, by disposing the antireflection or antiglare film on the front substrate, it is possible to prevent superimposed images due to reflection, deterioration in contrast due incidental light from the front surface side, etc.

Furthermore, when the effect of external light incident from the rear of the display apparatus is small, namely when the amount of external light is small, the visible-wavelength region light transmittance of the transparent thin-film EL display apparatus is set at more than 60%, thereby enabling enhancement of the visibility of the background. By preferably setting such transmittance at more than 70%, the visibility of the background is not impaired even when the amount of external light is extremely low, such as at night.

Further, when the effect of external light becomes greater, visible light transmittance is set at 70% or less, or preferably 60% or less. By such setting, the contrast of the display can be enhanced and the visibility of the display can be ensured even when high-intensity light such as morning sunlight, evening sunlight, or the like enters from the rear of the display apparatus.

BRIEF DESCRIPTION OF THE DRAWINGS

These and other objects, features and characteristics of the present invention will be appreciated from a study of the following detailed description, the appended claims, and drawings, all of which form a part of this application. In the drawings:

DETAILED DESCRIPTION OF THE PREFERRED EMBODIMENTS

Specific preferred embodiments of the present invention will be described below with reference to the drawings.

(First Embodiment)

Figure 1:
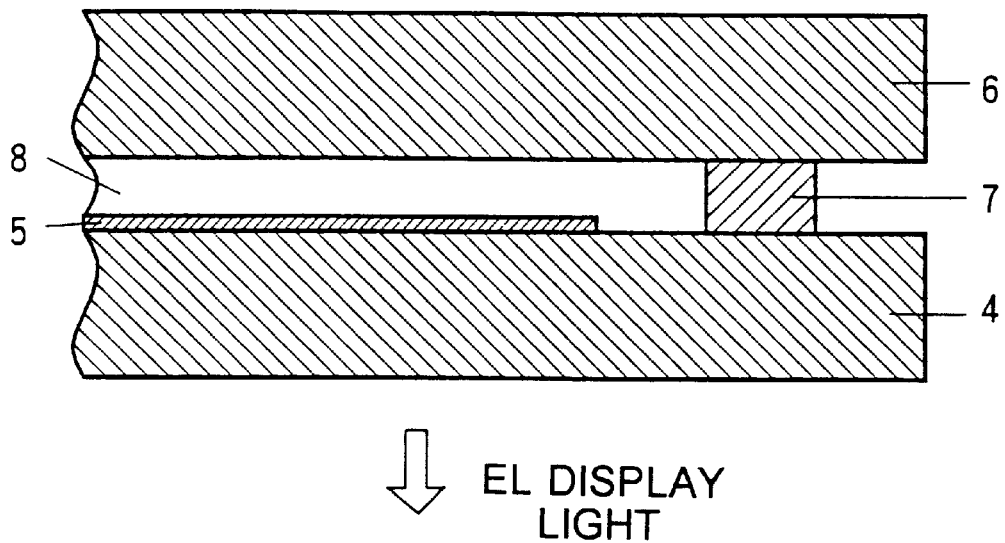
FIG. 1 is a sectional view showing a transparent EL display apparatus according to a first embodiment of the present invention.
Figure 2:
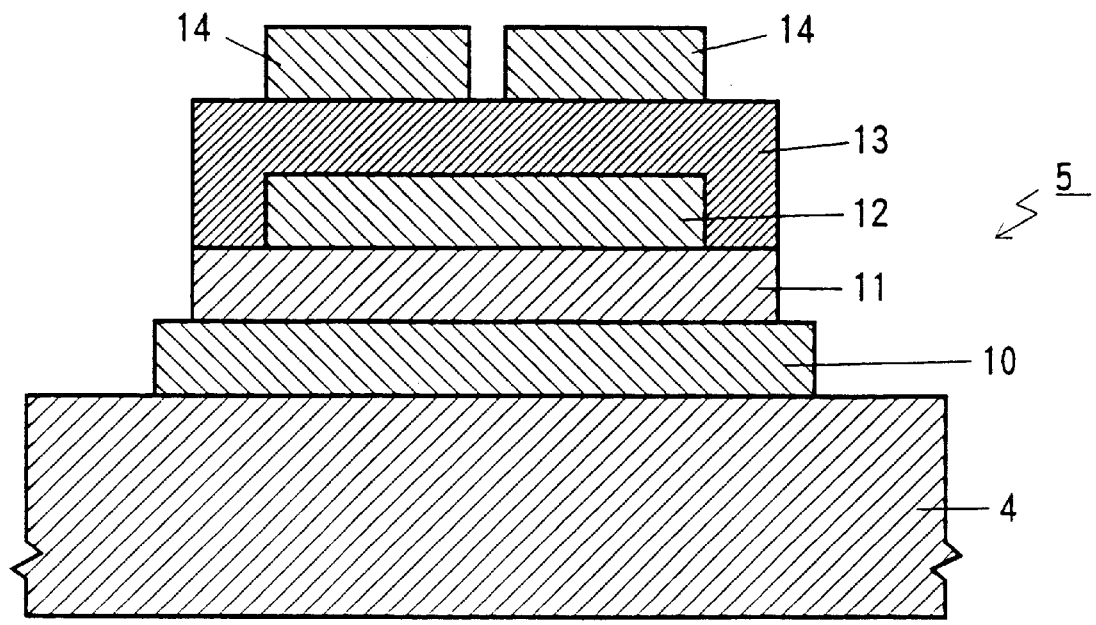
FIG. 2 is an enlarged view of the main components of the EL element.

FIG. 1 is a typical view showing a section of a transparent thin-film EL display apparatus according to the present invention. Also, FIG. 2 is an enlarged typical view showing a portion of the section shown in FIG. 1, showing the structure of a well known thin-film EL element 5. The transparent thin-film EL element 5 is sequentially formed on a non-alkaline glass substrate 4, which is a light-transmitting insulation substrate, with the following thin films. On the glass substrate 4 there are formed, in a laminated manner a first transparent electrode 10 made of an ITO (Indium Tin Oxide) transparent conductive film, a first insulation layer 11 formed of transparent tantalum pentoxide $Ta_2O_5$), or the like, a luminescent layer 12 whose host material consists of zinc sulfide (ZnS), a second insulation layer 13, and a second transparent electrode 14 made of a zinc oxide ($ZnO:Ga_2O_3$) transparent conductive film. A rear substrate 6 made of separately prepared photochromic glass and a front substrate formed thereon together with the transparent thin film EL element are disposed facing each other so that the EL element is located therebetween, and both substrates are held by a spacer 7 so as to be spaced away from each other by a prescribed distance. A light-transmitting insulation material 8 such as a silicone oil is inserted between both substrates so as to impart an airtight seal between these two substrates (see FIG. 1).

Next, a method for manufacturing the above-mentioned transparent thin film EL display apparatus, particularly the EL element 5 portion, will be described hereunder.

The ITO (Indium Tin Oxide) transparent conductive film is DC sputtered on the glass substrate 4 in a gaseous-mixture atmosphere of argon (Ar) and oxygen ($O_2$) to form a film having a thickness of 200 nm. The resulting film is wet-etched and thereby fabricated into desired segment-shaped pattern configurations to thereby form the transparent first electrode 10 (see FIG. 4).

On the resulting transparent first electrode 10, using silicon (Si) as a target, high-frequency sputtering is performed in a gaseous-mixture atmosphere of argon (Ar), nitrogen ($N_2$) and a small amount of oxygen ($O_2$) to thereby form a silicon oxide nitride (SiON) film having a thickness of 100 nm. Thereafter, high-frequency sputtering is performed on the resulting film in a gaseous-mixture atmosphere of argon and oxygen, using a tantalum pentoxide/aluminum oxide mixture ($Ta_2O_5 \cdot Al_2O_3$) as a target, to thereby form a film having a thickness of 300 nm, thus forming the first insulation layer 11.

Next, using zinc sulfide (ZnS) to which TbOF is added as a target, high-frequency sputtering is performed in a gaseous mixture of argon and helium (He) to thereby form a luminescent layer 12a with a thickness of 500 nm. At this time, a film formation region is defined using an SUS or glass mask such as that shown in FIG. 5A. Namely, in FIG. 4, this film formation region corresponds to a speed display section.

Figure 4:
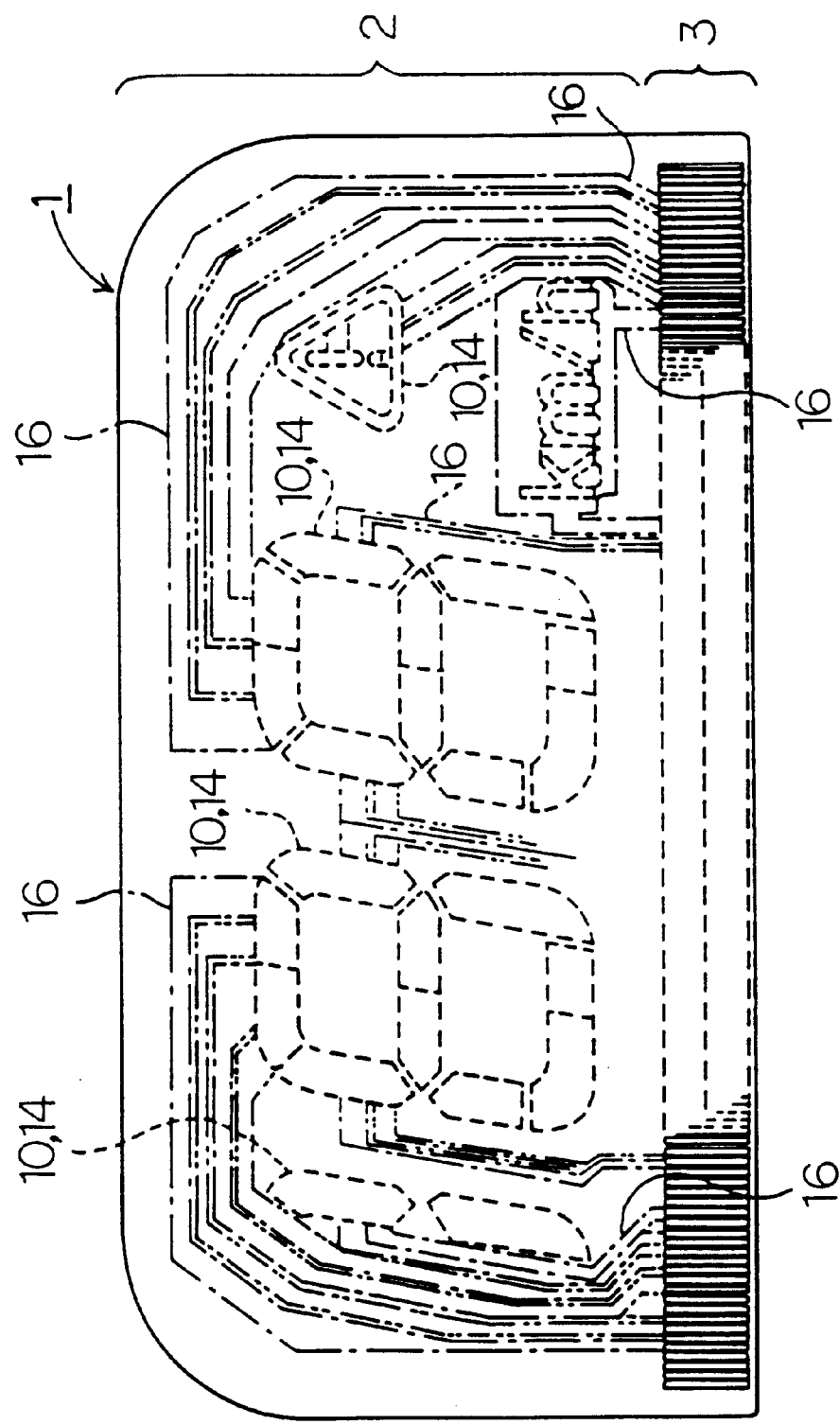
FIG. 4 is a plan view showing the display panel of FIG. 3.
Figure 5A:
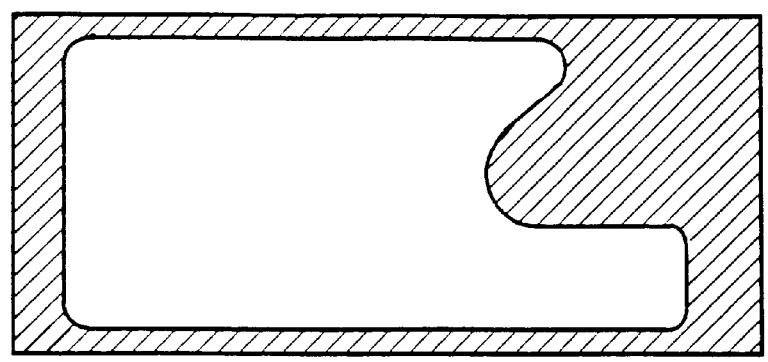
FIGS. 5A and 5B are diagrams showing mask patterns, these mask patterns being used when forming the luminescent layers.
Figure 5B:
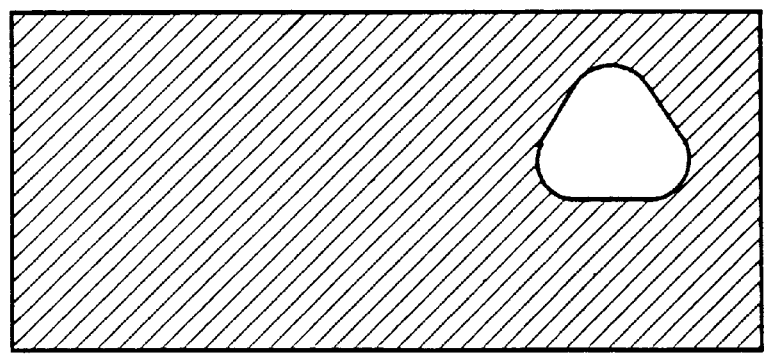

Next, by defining a film formation region by using the mask shown in FIG. 5B, film formation is performed using an electron beam deposition technique with an Mn-added zinc sulfide (ZnS) as a deposition pellet, to thereby form a luminescent layer 12b having a thickness of 620 nm on the same plane. As a result, the luminescent layer for the alarm display section shown in FIG. 4 is formed.

Then, in the same manner as mentioned above, an SiON film with a thickness of 100 nm and a $Ta_2O_5 \cdot Al_2O_3$ film with a thickness of 200 nm are successively formed on the above-mentioned luminescent layer and, on the resulting films, a SiON film of 100 nm in thickness is further formed, thus forming the second insulation layer 13.

After the above-mentioned thin films have been formed in a laminated manner, a ZnO transparent conductive film to which $Ga_2O_3$ is added is formed by ion plating to a thickness of 450 nm, and this film is formed to a prescribed configuration by photo-etching, thus fabricating the transparent second electrode 14.

The composing material of each of the first insulation layer 11 and second insulation layer 13 in the above-mentioned transparent thin-film EL element is not limited to the above-mentioned SiON, $Ta_2O_5 \cdot Al_2O_3$, etc. The first and second insulation layers may each be a transparent insulation layer made of other materials such as strontium titanate ($SrTiO_3$), barium tantalate ($BaTa_2O_6$), hafnia ($HfO_2$), silicon nitride ($Si_3N_4$), alumina ($Al_2O_3$), etc. Further, although in the above-mentioned example the two kinds of luminescent layers 12a and 12b are formed in the same plane, less (one only) or more (two or more) luminescent layers may be formed as long as they are transparent.

Figure 6:
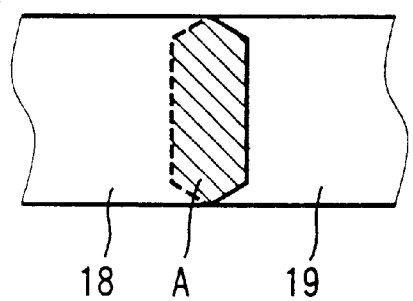
FIG. 6 is a plan view showing a wiring pattern at the luminescent portion.

Further, the above-mentioned first and second transparent electrodes are not limited to the above-mentioned combination. Namely, it suffices that at least one of such transparent electrodes is formed in the intended configuration of a portion to be displayed, i.e. a 7-segment numeral, character, or figure (indicated in one-dot or two-dot chain lines in FIG. 4). Accordingly, the luminescence display portion such as a character, figure or the like may also be formed by an overlapped portion A (in the case of FIG. 6, the numeral "1") of the first transparent electrode 18 and the second transparent electrode 19, as shown in FIG. 6.

Thereafter, a connection terminal portion 3 is formed on a lower edge portion of the glass substrate 4 in such a manner as to be in contact with each of the end portions of transparent connection portions 16 each extending from its corresponding first transparent electrode 10 and second transparent electrode 14. The connection terminal portion 3 is formed as films from a conductive metal such as nickel, gold, etc. by a deposition technique or a sputtering technique. The connection terminal films that compose the connection terminal portion 3 are formed in a finely divided manner by a photo-etching technique so as to prevent the respective electrodes from short-circuiting, thus connecting to each end of the transparent connection portions 16.

Note that although the above description has been given using FIG. 4, which is viewed from the display side for clarity of explanation, since in the above-mentioned example the EL element is formed on the light-transmitting front substrate, the pattern configuration as viewed from the EL element side is the reverse that of the FIG. 4 which has been described in the above-mentioned example.

On a side that is rearward of the front substrate 4 equipped with the transparent thin-film EL element formed as mentioned above, the above-mentioned rear substrate 6 formed of photochromic glass is imposed with a prescribed distance or gap provided therebetween by gap-forming transparent resinous beads (not shown) each having a diameter of approximately 50 μm. Thereafter, the inside surfaces of both substrates are adhered to each other at their peripheral portions by spacers 7 made of transparent adhesive agent.

Next, a moisture-proof silicone oil 8 is inserted between the substrates from an oil insertion opening prepared by cutting out a part of the spacer 7, the oil insertion opening being sealed by an adhesive agent. When the resulting EL display apparatus is in this condition, the peripheral edge and angular portions of the front substrate 4 and rear plane substrate 6 are exposed. Therefore, for protection, the upper edge portion and right/left edge portions of the transparent display section 2 (FIG. 3) may be covered by, for example, synthetic resin.

Figure 3:
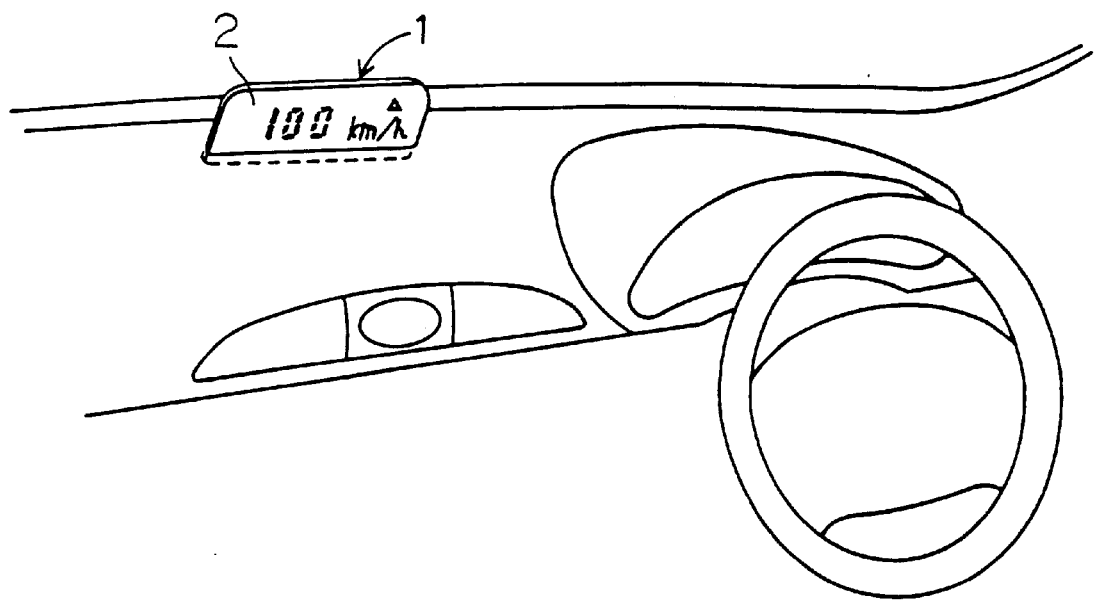
FIG. 3 is an image view showing the transparent EL display apparatus used as a heads-up display.

As shown in FIG. 3, the inboard automobile display 1 constructed as mentioned above is mounted on a dashboard located inside the windshield of the automobile in such a manner that the transparent display section 2 stands erect on the dashboard and the connection terminal portion 3 such as that shown in FIG. 4 is embedded in the dashboard. A drive circuit (not shown) is connected to the connection terminal portion 3. In this case, the connection terminal portion 3 may be connected to the drive circuit and the like via a bendable member such as, for example, a flexible printed board or the like.

Upon application of alternating current from the drive circuit to the first transparent electrode 10 and the second transparent electrode 14 via the connection terminal portion 3, the luminescent layer 12 clamped therebetween emits light. Meanwhile, the first transparent electrode 10 or second transparent electrode 14 portion to which alternating current is applied is controlled by a control circuit not shown, whereby numerals indicating vehicle speed or warning figures are displayed by luminescence. In this embodiment, the numeral portion and the warning figure portion are respectively displayed in green and amber.

At this time, since only the numerals, characters, and figures are displayed on the transparent display section 2 located on the dashboard, the driver can clearly recognize the display without his line of sight deviating greatly from the front of the vehicle and without obstructing his field of view. Further, when high-intensity external light such as early morning sunlight, late afternoon sunlight or the like is incident from the forward direction (from the direction of the rear surface of the display apparatus), the photochromic glass that composes the rear substrate quickly changes to dark brown, whereby the driver can read information such as characters, figures, and the like displayed on the display section without being obstructed by such external light. When the incidence of high-intensity external light ceases due to, for example, a change in direction, the photochromic glass is restored to its original transparent state. Therefore, with the forward field of view being kept unobstructed, the driver can clearly recognize the characters, figures and the like displayed on the display section while viewing the background of the display apparatus.

In this first embodiment, although the rear substrate 6 has been formed using photochromic glass, the rear substrate may be formed using ordinary transparent glass with a thin film of photochromic compound applied thereon. Further, alternatively, the rear substrate may be formed using ordinary transparent glass and then a thin film of photochromic compound may be formed on the second transparent electrode 14 of the transparent thin-film EL element formed on the front substrate. In addition, this thin film of photochromic compound may be a plastic film or plate containing a photochromic compound. Note that although in this embodiment explanation has been given regarding the segment display apparatus, the same effect can of course be obtained regarding a dot-matrix display apparatus as well.

(Second Embodiment)

Figure 7:
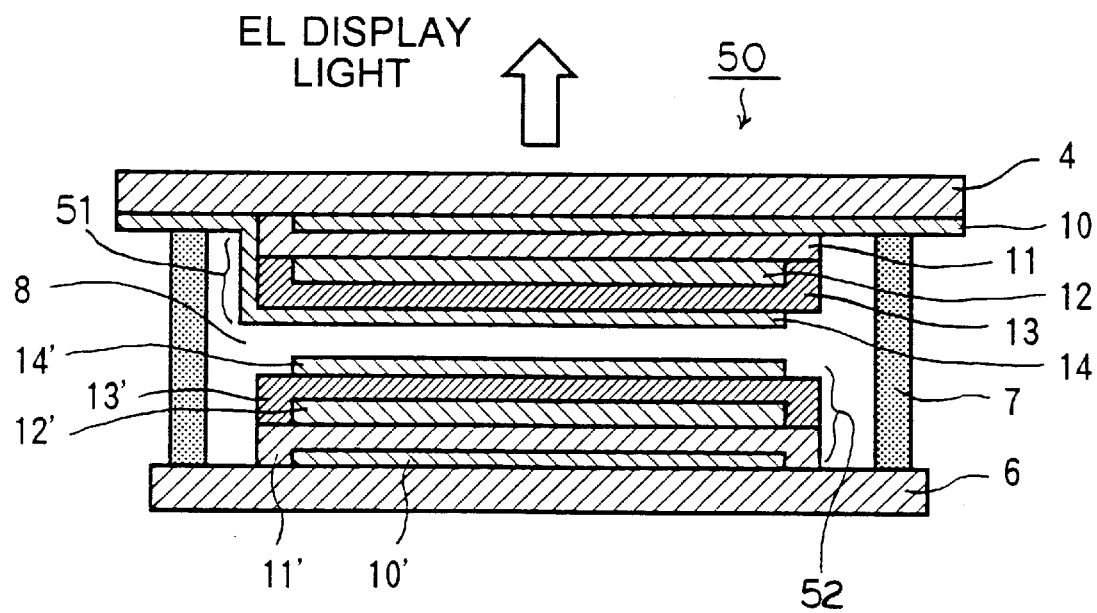
FIG. 7 is a sectional view showing a second embodiment.

Although in the above-mentioned embodiment the thin film EL element 5 has been formed on the light-transmitting front substrate 4, the thin-film EL element may also be formed on the rear substrate, i.e. photochromic glass side. FIG. 7 is a typical view showing a cross-sectional structure of a transparent thin-film EL display apparatus 50 which is one such embodiment.

The transparent thin-film EL display apparatus 50 is of a structure wherein transparent thin-film EL elements 51 and 52 which differ from each other in luminescence color are formed on the light-transmitting front substrate 4 and the photochromic glass, i.e. rear substrate 6, respectively, the thin-film EL elements 51 and 52 being formed in such a manner as to face each other. In this structure, the respective display regions of mirror-symmetrical configurations are exactly overlapped upon each other, so that it is possible to display information at the same portion with modified colors. Therefore, for example, speed display can be displayed by signalling colors of green, yellow, and red, according to vehicle speed. In this case as well, as mentioned above, even when external light is incident from the rear, the photochromic glass that composes the rear substrate quickly changes to dark brown. Thus, the driver can read information displayed on the display section such as characters, figures and the like without being hampered by external light.

(Third Embodiment)

Figure 8:
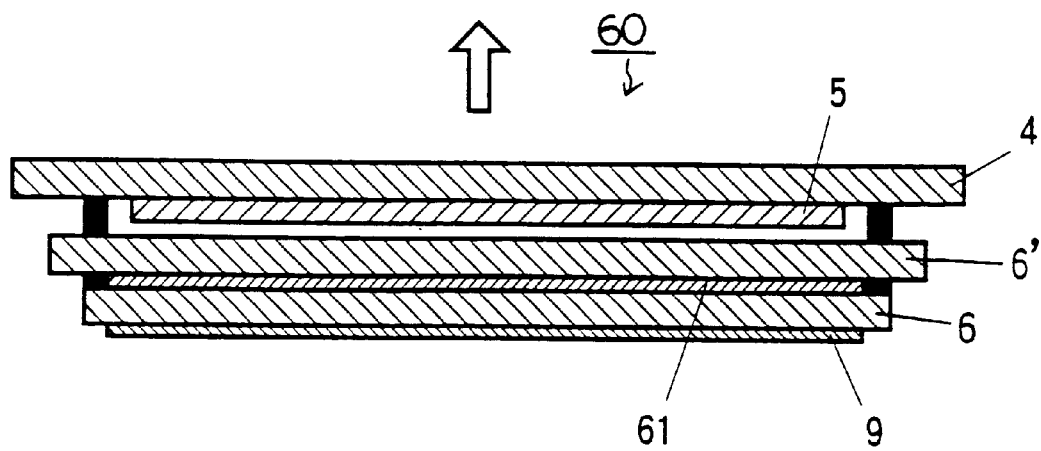
FIG. 8 is a sectional view showing a third embodiment.

Another example of the "optical component exhibiting a reversible change in light transmittance according to the intensity of incident external light" which is not a photochromic compound will now be described below. In FIG. 8, a thin-film EL display apparatus 60 is shown which uses a solar cell 9 as a means for sensing the external light incident from the rear and uses a liquid crystal device (LCD) 61 as an electro-optical display having a light shutter function.

The liquid crystal device 61 that functions as a light shutter is formed on a rear side of the transparent thin-film EL element 5 by utilizing a rear substrate 6' that consists of a transparent glass plate. Though not shown in FIG. 8, this liquid crystal device 61 is actually a transmission type liquid crystal device which comprises, in addition to the liquid crystal layer thereof, an orientation film and a transparent electrode layer disposed on both sides thereof, and a deflection plate corresponding to an outermost layer. The relationship between the liquid crystal and the deflecting plate is set such that it is normally open (transparent) and closes (darkens) when energized.

The solar cell 9 for sensing external light is formed as a thin film on the transparent glass substrate 6a (which is not a photochromic glass as in the case of the first embodiment) located on the outside (rear) of the liquid crystal device 61. The solar cell 9 means a photoelectromotive force element which uses various semiconductor materials such as amorphous silicon (a-Si) and the like. However, in this embodiment, that this element is transparent is an indispensable requirement. As one example of such a solar cell, a solar cell 9 may be formed in which transparent electrodes each made of ITO or the live are disposed on both sides of an a-Si layer in the three-layer structure of PIN, the band gap being adjusted so as to increase transmission of visible regions.

As the means for sensing external light incident upon the display apparatus from the rear, other means such as a CdS cell, a PIN photodiode, or the like can also be used. However, the use of the solar cell 9 makes it possible to sense the intensity (brightness) of external light and also to operate the liquid crystal device 61 by use of power generated in correspondence with such intensity. Therefore, this use provides an advantage that it is unnecessary to separately provide a power source for energizing the liquid crystal device 61. Also, by matching the power output of the solar cell 9 with the load constituted by the liquid crystal device 61, it is also possible to omit the use of circuit parts such as a comparator and the like.

Figure 10:
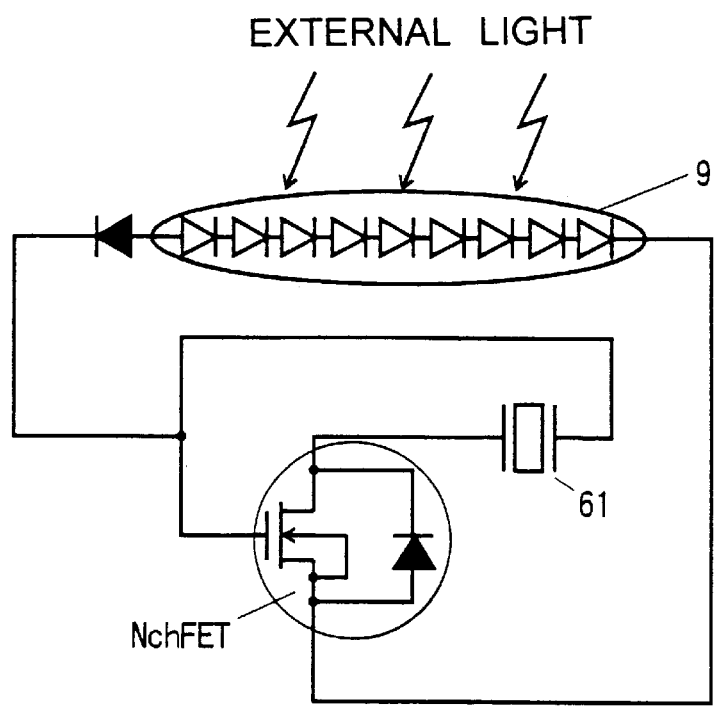
FIG. 10 is an equivalent circuit diagram showing a light shutter mechanism according to the third embodiment.

FIG. 10 shows a necessary minimum circuit construction comprising the solar cell 9 and the liquid crystal device 61. The role of these elements (solar cell and liquid crystal device) in this embodiment is merely to suppress the influence of external light and they are not required to be controlled with high precision. Accordingly, in this circuit construction, a constant voltage circuit construction is omitted which usually is composed of a zener diode and a resistor and intended to be used for stabilizing the output of the solar cell. Of course, other circuit constructions may be used as the necessity arises.

Note that although in FIG. 8 the display apparatus is shown with the respective constituent parts thereof being integrally formed, the respective constituent parts may be incorporated by being stacked upon each other, without having their transparencies impaired.

In this thin-film EL display apparatus 60 as well, as mentioned above, even when external light is incident from the rear, a photoelectromotive force is generated according to the intensity of the incident light due to the existence of the solar cell 9 disposed at the rear, and this photoelectromotive force causes operation of the liquid crystal device 61 so as to shut out external light. There-ore, the driver can read information displayed on the display section such as characters, figures and the like without being hampered by external light.

(Fourth Embodiment)

Figure 9:
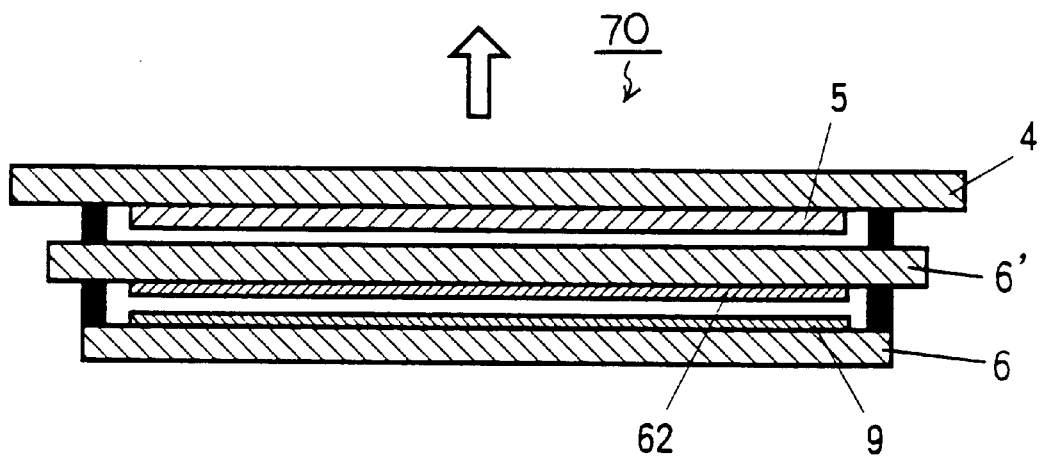
FIG. 9 is a sectional view showing a fourth embodiment.

As one more example of the "optical component exhibiting a reversible change in light transmittance according to the intensity of incident external light", there is an electro-chromic device (ECD) 62 having a light shutter function. A thin-film EL display apparatus 70 is shown in FIG. 9, 4n which such electro-chromic device 62 is used. In this example, the electro-chromic device (ECD) 62 is formed on a transparent glass substrate 6'. Note that as a means or sensing external light, a solar cell 9 is formed on the transparent glass substrate 6a (which is not photochromic glass) as in the case of the third embodiment. As the electro-chromic device (ECD) 62 there is one which uses a liquid electrolyte as the electrolyte and a total solid type one which uses a solid electrolyte as the electrolyte. Any one of these electro-chromic devices (ECD) may be usable as long as it is transparent.

The electro-chromic devices (ECD) 62 are each colored or discolored depending upon the energizing polarity and most of them usually have storability. Therefore, they are known as low power-consumption type displays. However, in the case of the use in this embodiment, it is preferable for the electro-chromic devices to have no storability. In a case where the ECD 62 is of a structure with storability, there is the necessity that energization be done for discoloring and, if a circuit construction therefor is provided, it would sufficiently serve the purpose.

Figure 11:
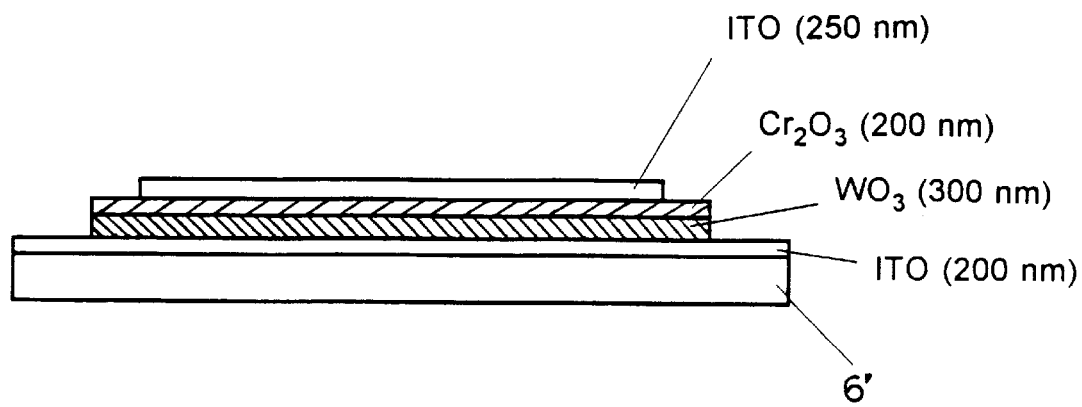
FIG. 11 is a sectional view showing the structure of an ECD according to the fourth embodiment.

From the above-mentioned viewpoint, in FIG. 9 the thin-film EL display apparatus 70 which uses a non-storability type total solid type ECD 62 is shown. Also, in FIG. 11 there is shown a typical view of a cross-sectional structure of the total solid type ECD 62. In FIG. 9, the ECD 62 is formed on the rear substrate 61. When external light enters from the rear, the co-operation of the solar cell 9 and the ECD 62 causes generation of a photoelectromotive force according to the intensity of the incident light. Simultaneously, the ECD 62 is colored blue (dark blue) due to the resulting power, thereby blocking external light. Thus, the driver can read information displayed on the display section such as characters, figures and the like without being obstructed by the external light.

(Fifth Embodiment)

Note the following beforehand. In a case where the intensity of external light (the quantity of external light) is low, namely in a case where the surroundings of the vehicle are dark (for example, during a time period from evening to night), visibility of the background is deteriorated though visibility (contrast) of the display is enhanced. Conversely, in a case where the intensity of external light (the quantity of external light) is high, namely in a case where the surroundings of the vehicle are bright (for example, while travelling in sunlight on a snow-covered road or during the daytime), visibility of the display (contrast) becomes inferior though visibility off the background becomes superior. Accordingly, it is necessary to increase the light transmittance when the external surrounding is dark and to decrease light transmittance when the external surrounding is bright.

In view of this, at what value the light transmittance should be set in such cases was examined by visibility evaluation based on the use of the following subjective evaluation test (visibility test).

The evaluation test was performed as follows. As shown in FIG. 3, a transparent thin-film EL display apparatus 2 as a comparative example was erected on the dashboard located inside the windshield of each automobile, and various acrylic plates differing in light transmittance from each other were adhered to the back side (rear) of the display apparatus 2. Thus, the evaluation test was performed at the same place and in evaluation surroundings which were as equalized as possible.

Note also that the transparent thin-film display apparatus 2 as a comparative example is one which uses a transparent glass substrate 6a as the rear substrate of the first embodiment. This display apparatus 2 is a conventional-type transparent thin-film EL display apparatus 2 which exhibits no change in light transmittance due to external light.

Figure 12:
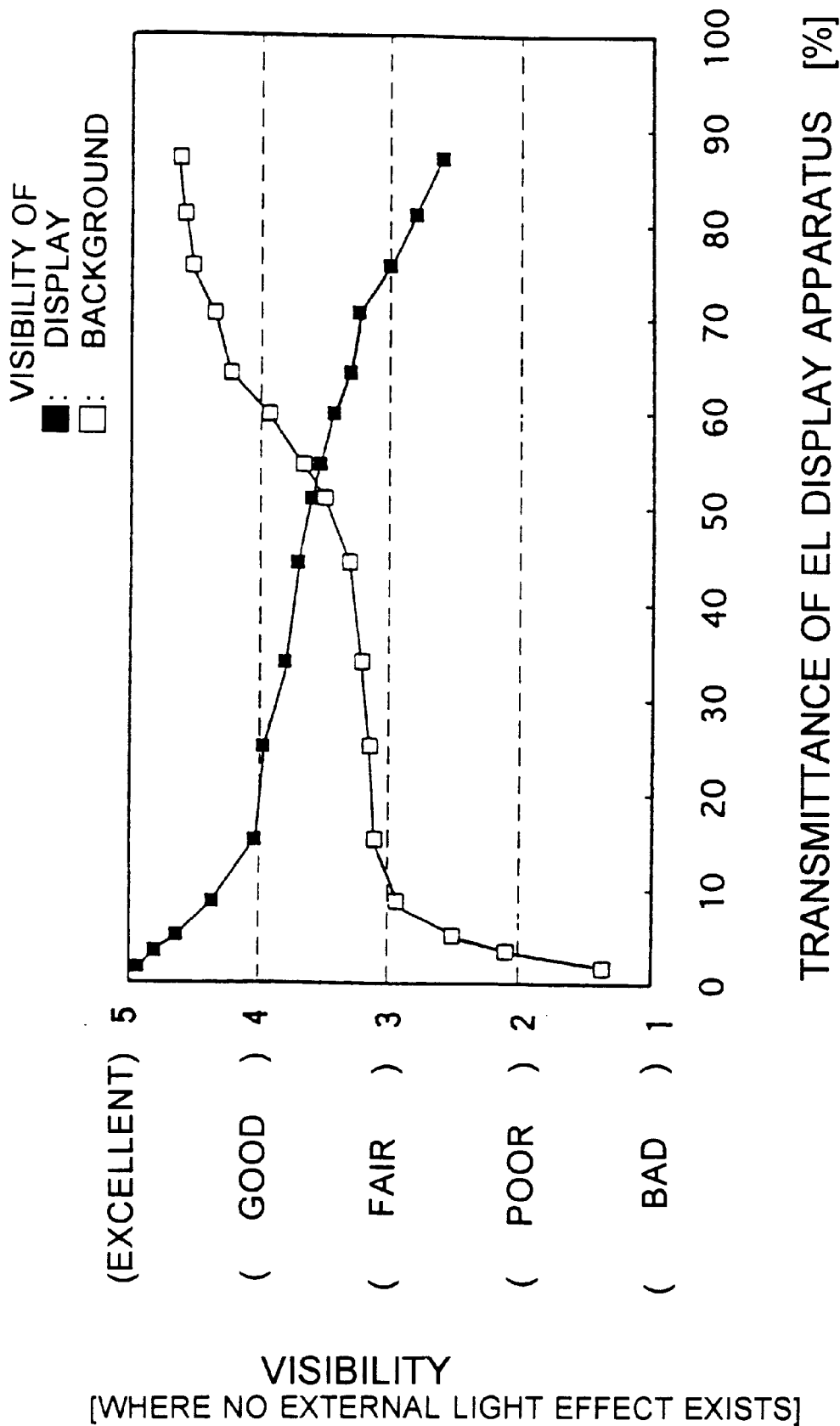
FIG. 12 is a graph showing weighted averages in five stages of the results of a visibility test in a case where there is no effect of external light, as the relationship of the EL display apparatus to transmittance.
Figure 13:
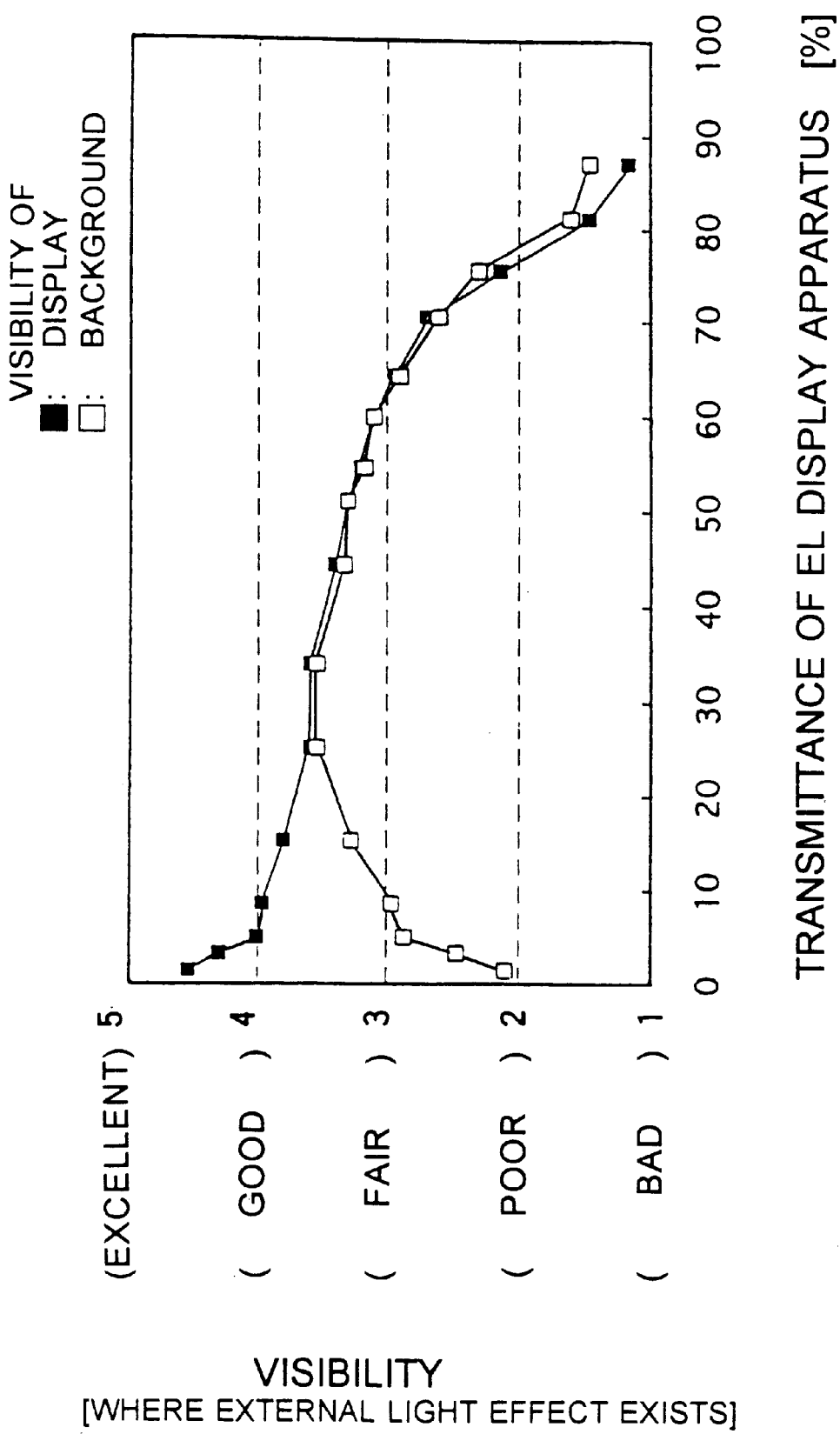
FIG. 13 is a graph showing weighted averages in five stages of the results of a visibility test in a case where there is the effect of external light, as the relationship of the EL display apparatus to transmittance.

The acrylic plates differing in light transmittance were applied and presented, while being replaced at random intervals, to each of thirty examinees (twenty adult males and ten adult females), and visibility was evaluated by a 5-stage evaluation method. The results of the evaluation test in the case where external light has no effect upon visibility and in the case where external light has an effect thereupon are respectively shown in Tables 1 and 2 below. Also, the relationships each established between the weighted average of the evaluation test results and the light transmittance of the EL display apparatus are shown in FIGS. 12 and 13, respectively.

TABLE 1

WHERE EXTERNAL LIGHT EFFECT DOES NOT EXIST

| | Visibility of EL Luminescence Display | | | | | Visibility of Background | | | | |
|---|---|---|---|---|---|---|---|---|---|---|
| Evaluation Transmittance | Bad (1) | Poor (2) | Fair (3) | Good (4) | Excellent (5) | Bad (1) | Poor (2) | Fair (3) | Good (4) | Excellent (5) |
| *¹87.1% | | 12 | 18 | | | | | | 11 | 19 |
| *²81.3% | | 6 | 24 | | | | | | 12 | 18 |
| 75.7% | | 3 | 24 | 3 | | | | | 14 | 16 |
| 70.7% | | | 23 | 7 | | | | | 19 | 11 |
| 64.4% | | | 21 | 9 | | | | | 23 | 7 |
| 60.1% | | | 17 | 13 | | | | 5 | 22 | 3 |
| 54.8% | | | 14 | 16 | | | | 11 | 18 | 1 |
| 51.2% | | | 12 | 18 | | | | 15 | 15 | |
| 44.4% | | | 10 | 19 | 1 | | | 21 | 9 | |

TABLE 1-continued

WHERE EXTERNAL LIGHT EFFECT DOES NOT EXIST

| | Visibility of EL Luminescence Display | | | | | Visibility of Background | | | | |
|---|---|---|---|---|---|---|---|---|---|---|
| Evaluation Transmittance | Bad (1) | Poor (2) | Fair (3) | Good (4) | Excellent (5) | Bad (1) | Poor (2) | Fair (3) | Good (4) | Excellent (5) |
| 34.1% | | | 7 | 22 | 1 | | | 24 | 6 | |
| 25.2% | | | 4 | 23 | 3 | | | 26 | 4 | |
| 15.4% | | | 3 | 23 | 4 | | 2 | 23 | 5 | |
| 8.7% | | | 1 | 17 | 12 | | 5 | 22 | 3 | |
| 5.1% | | | | 11 | 19 | 2 | 11 | 17 | | |
| 3.4% | | | | 6 | 24 | 4 | 19 | 7 | | |
| 1.6% | | | | 2 | 28 | 19 | 11 | | | |

*1, *2) Data of transparent thin-film EL display apparatuses per se as comparative examples, the display apparatuses having no acrylic plate. Specimens *1 and *2 differ from each other.

TABLE 2

WHERE EXTERNAL LIGHT EFFECT EXISTS

| | Visibility of EL Luminescence Display | | | | | Visibility of Background | | | | |
|---|---|---|---|---|---|---|---|---|---|---|
| Evaluation Transmittance | Bad (1) | Poor (2) | Fair (3) | Good (4) | Excellent (5) | Bad (1) | Poor (2) | Fair (3) | Good (4) | Excellent (5) |
| *1 87.1% | 25 | 5 | | | | 16 | 14 | | | |
| *2 81.3% | 16 | 14 | | | | 12 | 18 | | | |
| 75.7% | 3 | 20 | 7 | | | 5 | 11 | 14 | | |
| 70.7% | | 11 | 17 | 2 | | 1 | 11 | 17 | 1 | |
| 64.4% | | 4 | 24 | 2 | | | 6 | 21 | 3 | |
| 60.1% | | 2 | 23 | 5 | | | 2 | 23 | 5 | |
| 54.8% | | 1 | 22 | 7 | | | 2 | 21 | 7 | |
| 51.2% | | 1 | 19 | 10 | | | 1 | 20 | 8 | 1 |
| 44.4% | | | 18 | 12 | | | 3 | 15 | 11 | 1 |
| 34.1% | | | 13 | 16 | 1 | | 2 | 12 | 14 | 2 |
| 25.2% | | | 12 | 18 | | | 1 | 13 | 15 | 1 |
| 15.4% | | | 8 | 20 | 2 | | 2 | 19 | 8 | 1 |
| 8.7% | | | 5 | 21 | 4 | | 7 | 18 | 4 | 1 |
| 5.1% | | | 3 | 24 | 3 | | 8 | 19 | 2 | 1 |
| 3.4% | | | | 21 | 9 | 1 | 16 | 11 | 2 | |
| 1.6% | | | | 14 | 16 | 4 | 19 | 7 | | |

*1, *2) Data of transparent thin-film EL display apparatuses per se as comparative examples, the display apparatuses having no acrylic plate. Specimens *1 and *2 differ from each other.

The following were discovered as a result of the above-mentioned visibility test.

In a case where there is no effect of external light, namely in a case where the vehicle surroundings are relatively dark, the visibility of the display becomes better as light transmittance decreases, whereas the visibility of the background becomes worse. However, insofar as the light transmittance is in a range of 5% or more, visibility thereof is ensured which can be regarded as being "rather good" (½ or more of the examinees give at least an evaluation of "fair": see Table 1 and FIG. 12). Note that light transmittance of 60% or more, preferably 70% or more, is desirable in order to obtain good or excellent visibility of the background.

On the other hand, in a case where there is an external light effect, namely in a case where the vehicle surroundings are light, the visibility of the display exhibits a similar tendency to that exhibited in the case where there is no effect of external light, but the visibility thereof as a whole becomes inferior. Particularly in a range of more than 70% light transmittance, the display is very difficult to see (½ or more of the examinees give an evaluation of "poor" or worse than "poor": see Table 2 and FIG. 13). Accordingly, in order to enhance this visibility of the display, it is preferable to increase the display contrast by setting the visible light transmittance to 70% or less, preferably 60% or less.

Further, as regards the visibility of the background, there is no correlation between this visibility and the light transmittance of the EL display apparatus. Namely, the evaluation of the visibility tends to appreciably vary according to the examinees. It is thought that this is because a glare-proof effect and transparency are compounded in each examinee with the result that his feeling changes according to the status in which he is situated.

Accordingly, although when the light transmittance is in the range of from 70% to 5%, half or more of the examinees give an evaluation of "fair" or more than "fair", it has turned out to be particularly preferable that when the luminance of external light widely varies, the light transmittance of the display apparatus be set to range from 15% to 60% inclusive (the evaluation of 3 or more as graphically viewed in the weighted average) with "safety" being taken into consideration.

Note the following. The wording "darkening" referred to in the present invention means the phenomenon that color change occurs from a transparent condition or transparent colored condition to, for example, blue or dark brown, resulting in a decrease in light transmittance. The wording "reversible change" means the phenomenon that a condition of transparency changes to a colored condition of lower transmittance by the action of light and then is restored to its original transparent condition due to loss of light, or vice versa. In this case, the degrees of transmittance (such as hysteresis) therebetween are left out of the problem.

Further, the wording "intensity of external light" can be in other words "brightness of external light". The wording "photochromic glass" means glass which can make a photochromic compound substantially homogeneous, or glass which has photochromism characteristics.

Also note the following. In the above-mentioned various embodiments, since the EL element is a self-luminescent element, it is considered that there is the likelihood that the photochromic compound may be responsive to the luminescence given off therefrom. However, since this luminescence has a relatively sharp luminescence spectrum, it is possible to distinguish it from external light, which has a relatively wide spectrum. This is because, regarding the photochromic glass, it is possible to make a type which necessitates ultraviolet rays for darkening, or to make a type which darkens due to visible light rays having larger wavelengths, by adding a suitable component or components. That is, it is desirable that the "optical component exhibiting a reversible change in light transmittance according to the intensity of incident external light" be composed of a photochromic compound which is unlikely to react to the luminescence spectrum of the EL display but likely to react with respect to the wide light spectrum of external light.

(Sixth Embodiment)

Figure 14:
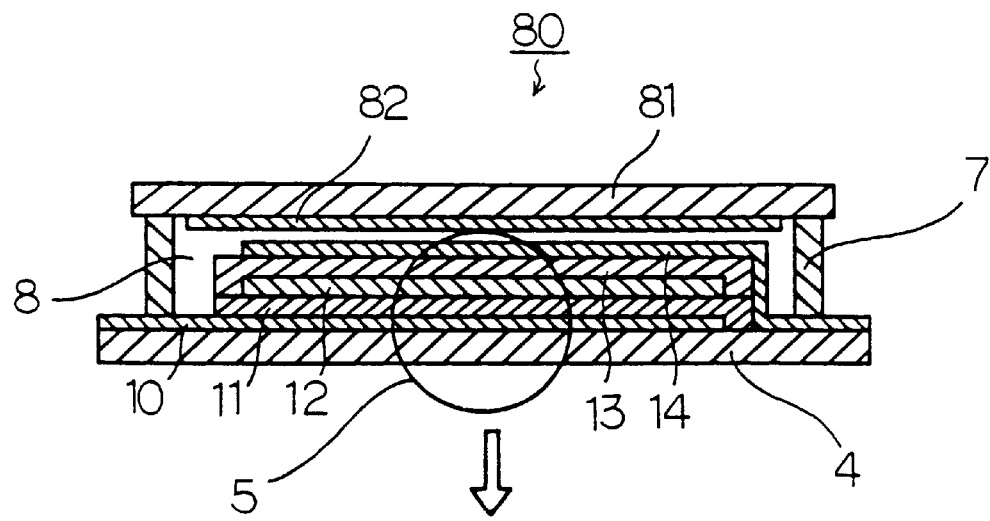
FIG. 14 is a sectional view showing a sixth embodiment.

As shown in FIG. 14, a transparent thin-film EL display apparatus 80 according to a sixth embodiment of the present invention has an EL element 5 prepared by forming the respective films on the front substrate 4 and positioned therein, and a rear substrate 81 is fixed thereto by means of the spacers 7 with a prescribed gap provided between both substrates. A light-transmitting insulation material consisting of silicone oil is inserted in a space portion 8 which, in turn, is hermetically sealed. In particular, a color transparent film (also referred to as a color filter) 82 is formed on the inner surface of the rear substrate 81. Note that the white arrow in the figure designates the direction of visual recognition.

Each of the front substrate 4 and the rear substrate 81 is a non-alkaline glass substrate which is a light-transmitting insulation substrate.

On the other hand, the color filter 82 is one which is formed by performing high-frequency sputtering in a gaseous-mixture atmosphere of argon (Ar) and 1% of added oxygen (O) at a 200° C. substrate temperature of the rear substrate 81 using tantalum sulfide ($TaS_2$) as a target, and thereby forming a film with a thickness of 60 nm. Through experiments, the light transmittance of the rear substrate 81 with the thus-formed color transparent film 82 was 57% on average in the visible range (of from 400 nm to 700 nm) (see FIG. 15).

Figure 16:
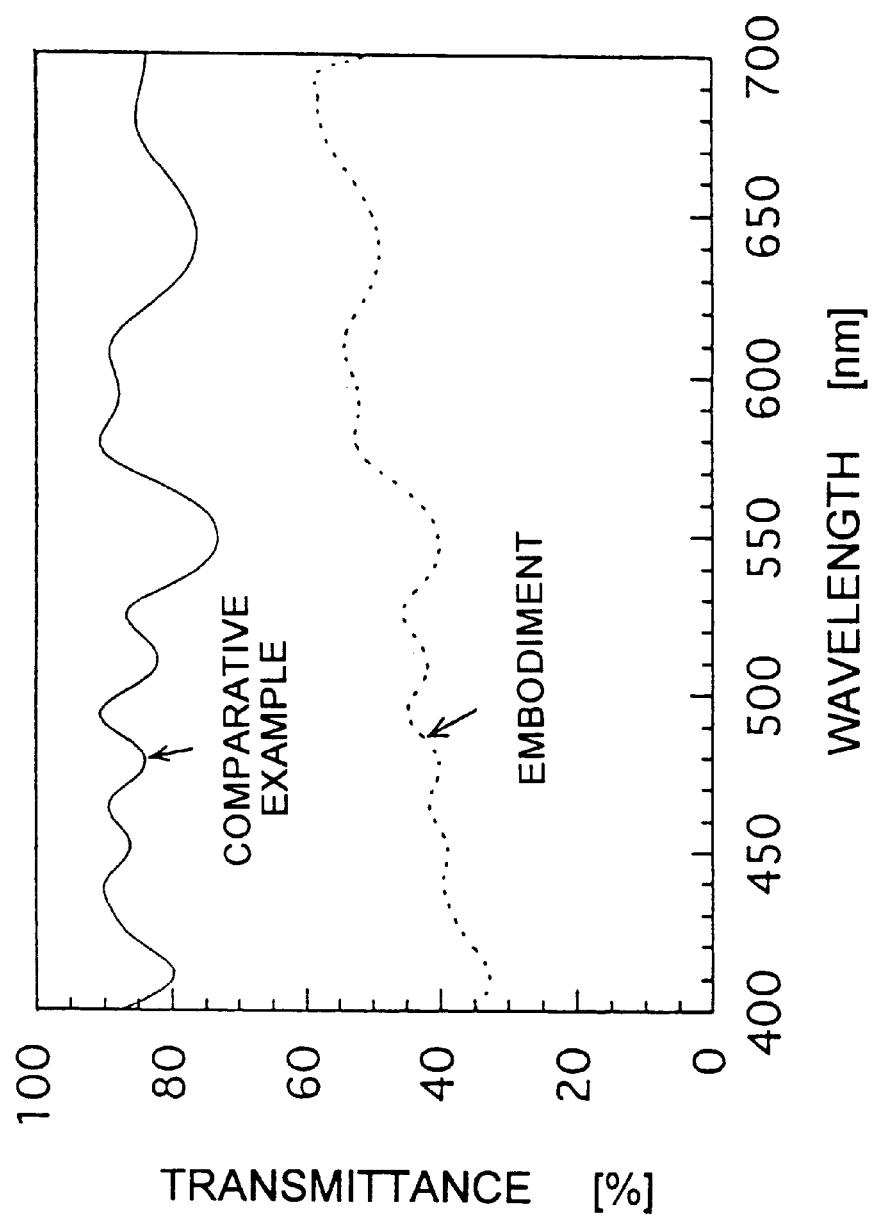
FIG. 16 is a graph showing the transmittances of the EL display apparatus according to the sixth embodiment and an EL display apparatus according to a comparative example.

The light transmittance of the finished transparent thin-film EL display apparatus 80 shown in FIG. 14 was 46% on average in the visible range (of from 400 nm to 700 nm) (see dotted line in FIG. 16).

In an automobile in which the above-mentioned transparent thin-film EL display apparatus 80 was mounted as shown in FIG. 37 display of the vehicle speed, etc. was experimentally conducted in a condition wherein high-intensity external light such as early morning sunlight, late afternoon sunlight, etc. was incident thereupon from the forward direction (from the rear of the display apparatus). At this time, it was confirmed that the contrast of the display could be sufficiently ensured and that information such as characters, figures, etc. which was displayed on the transparent thin-film EL display apparatus 80 was clearly readable. Further, as regards the background as viewed by the driver through the transparent thin-film EL display apparatus 80, the driver could clearly recognize the background with his eyes without his line of sight, directed toward the front of the automobile, deviating significantly.

Next, in order to confirm the function and effect of this sixth embodiment, a transparent thin-film EL display apparatus of a type provided with no color filter 82 was manufactured as a comparative example, this display apparatus was mounted on the dashboard of an automobile, and an actual automobile inboard test was performed. Note that the construction of the comparative example, except for the lack of a color filter 82, was completely the same as that according to the embodiment.

The light transmittance of this transparent thin-film EL display apparatus as a comparative example was measured. The average light transmittance in the visible range (of from 400 nm to 700 nm) was from 81% to 87% (the transmission spectrum of the transparent thin-film EL display apparatus which has an average transmittance of 87%, is shown as a solid line in FIG. 16).

Also in this transparent thin-film EL display apparatus as a comparative example, the displayed information such as numerals, characters, figures, etc. could be clearly read unless there was particularly high-intensity external light. Further, the driver could definitely recognize the background without his line of sight deviating from the front of the automobile, and without having his field of view obstructed.

However, when high-intensity external light such as early morning sunlight, late afternoon sunlight, or the like was incident from the front (the direction of the rear surface of the display apparatus), the display contrast deteriorated due to such external light, with the result that information such as characters, figures, and the like which was displayed on the display section was unable to be clearly read.

It is understood from the above that the average transmittance of the EL display apparatus has a significant effect upon the reading of the displayed information at times when external light enters.

From the results of the above-mentioned visibility test shown in Tables 1 and 2 and FIGS. 12 and 13, it has become clear that it is desirable in cases where the environment in which the display apparatus is installed exhibits wide variations, such as a vehicle, the light transmittance of the transparent EL display apparatus be in a range of from 5% to 70% inclusive, or preferably from 15% to 60% inclusive. Accordingly, in the transparent thin-film EL display apparatus 80 of the sixth embodiment, since the light transmittance is in such a range, good visibility of both the background and the displayed information is ensured even when external light enters.

Next, a variation of this sixth embodiment will be explained.

In the sixth embodiment, although an inorganic tantalum sulfide ($TaS_2$) film has been used as the color filter 82, an organic film may also be used. However, when this color film is provided within the housing, it must not be a type which is dissolved in, or reacts with, silicone oil or the like used for moisture-proofing the EL element. Further, it must be a type which can withstand the environment in which it is used or the storage environment temperature. As one example of such an organic color film there is a polyimide-based film, or a heat-resistant resist film.

Figure 15:
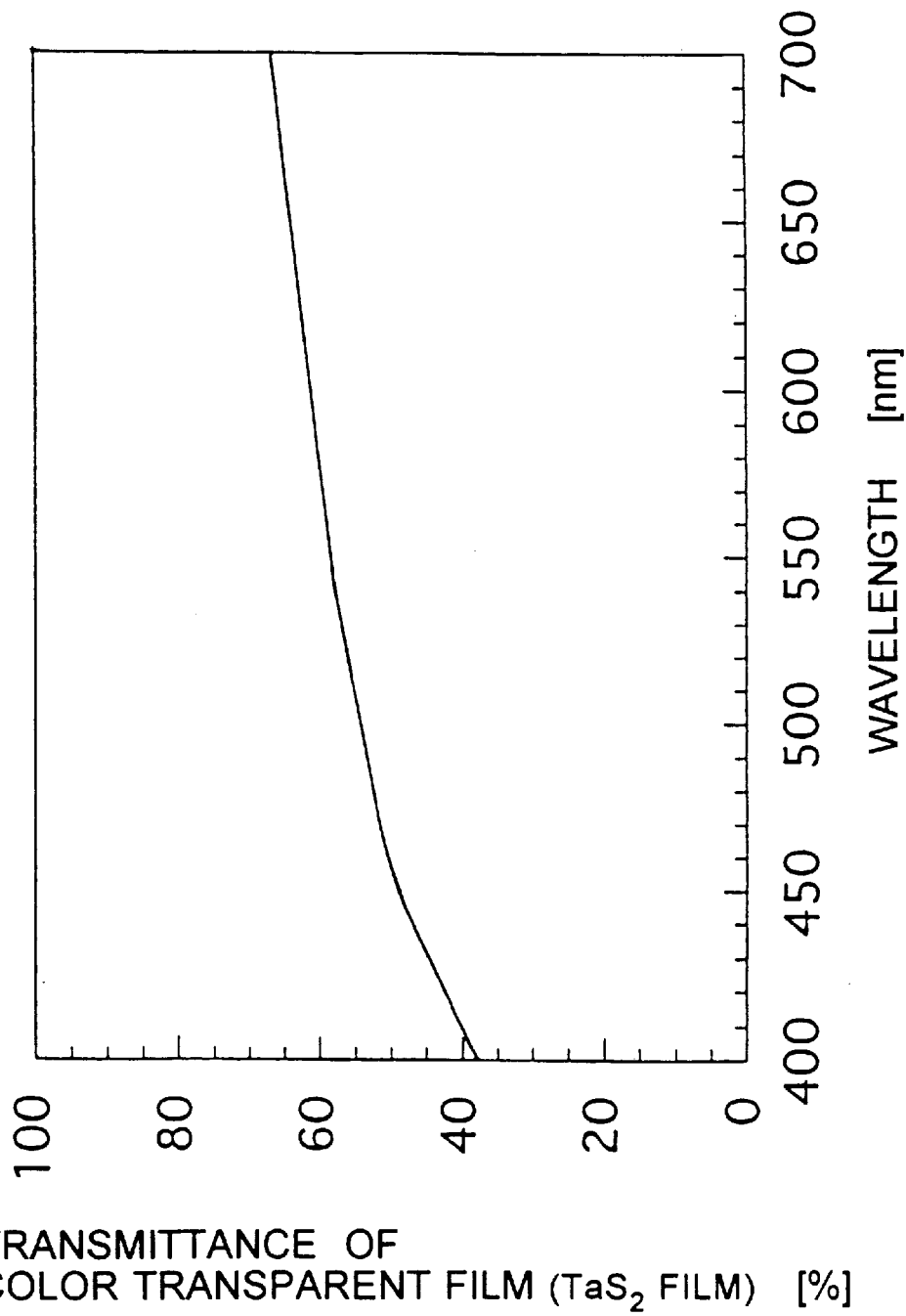
FIG. 15 is a graph showing the transmittance of transparent glass to which a $TaS_2$-made color transparent film has been adhered.

The transmission spectrum of the rear substrate 81 with tantalum sulfide (TaS$_2$) film used n this sixth embodiment is as shown in FIG. 15. Namely, the transmission spectrum is somewhat low on the short-wavelength side (light transmittance is somewhat below 40% at 400 nm) and gradually increases toward the long-wavelength side (light transmittance is approximately 65% at 700 nm). However, the curve of the transmission spectrum is genzle, i.e. this substrate 81 is effective in lowering light transmittance over the entire visible wavelength region.

Figure 17:
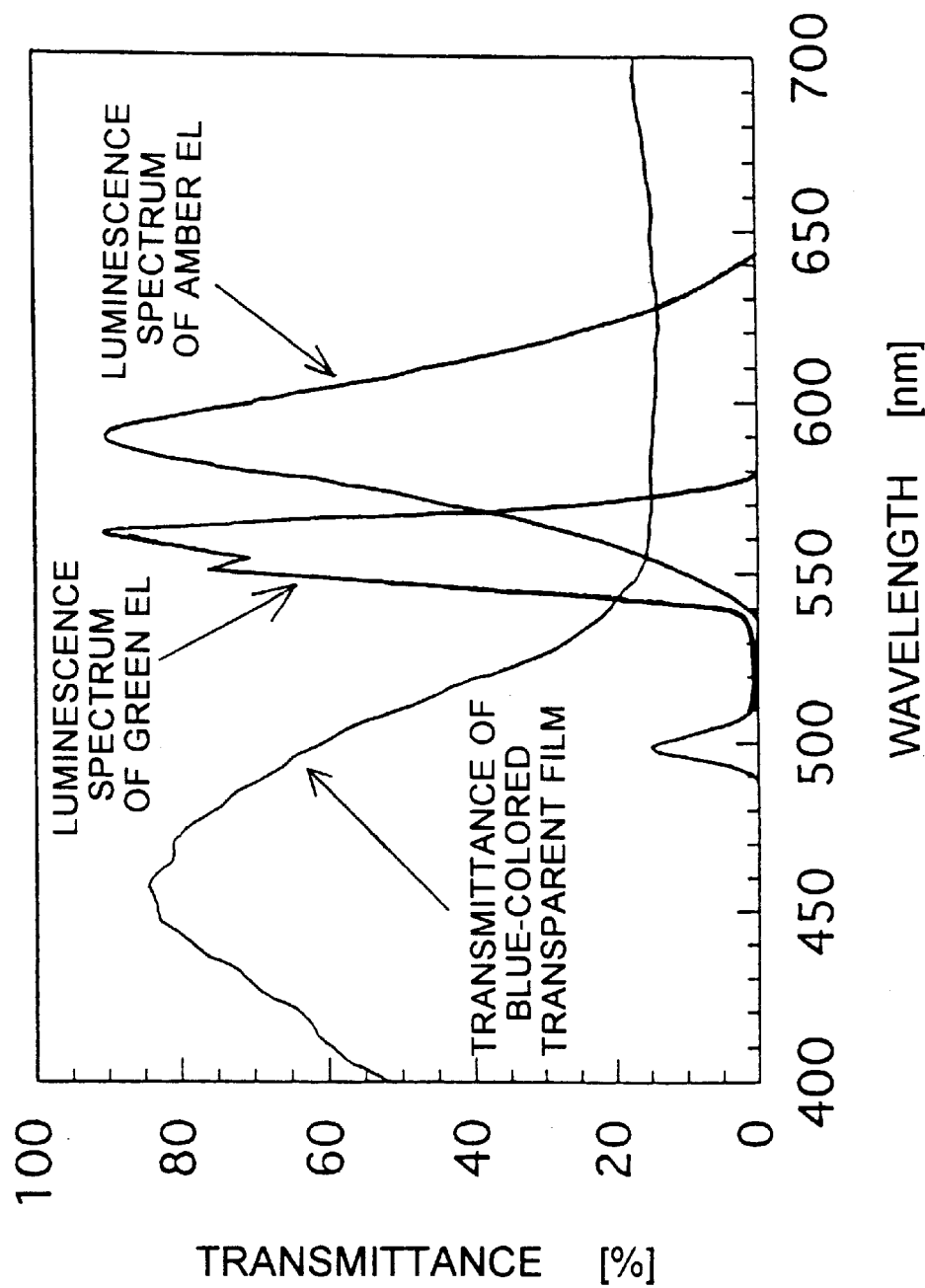
FIG. 17 is a graph showing the relationship between the transmittance of a colorable transparent film and the EL luminescence spectrum.

In contrast, when using a rear substrate on which, for example, a so-called "blue color filter" which consists of a resist added with a blue-color rendering dye (or pigment) is thinly coated, a transparent color rear substrate is obtained which exhibits high transmittance on the short wavelength side and low transmittance on the middle and long wavelength side as shown in FIG. 17. In this case, the effect is obtained of further improving contrast when using the EL element of this embodiment which exhibits green color or amber color luminescence (namely, which has a luminescence spectrum in the middle and long wavelength range). Note the following. The reason for thin coating the blue color resist filter is that if the filter is a complete filter, light transmittance decreases too much, deteriorating the visibility of the background. In this case as well, it is necessary that the light transmittance of the transparent thin-film EL display apparatus 80 be from 5% to 70% inclusive, preferably from 15% to 60% inclusive.

Note that the thickness of a preferable blue color resist filter is 1 μm or less.

In every one of the above-mentioned transparent thin-film EL display apparatuses each using a color film, this color film is formed on the rear substrate within the housing. However, if the insertion position of the color film is on a side further rearward than the luminescent layer of the rearmost thin film EL element which is among the thin-film EL elements each composing the transparent thin-film EL display apparatus, the object of the invention can naturally also be attained. However, in this case, the following attention should be paid according to the insertion position of the color film.

For example, in a case where the color film is disposed on the rear side of the rear substrate, since the color film is exposed to the surface and therefore liable to undergo scratching or the like, it is necessary either to protect it or to form it by using a suitable tough material. Further, the film composing the EL element, e.g. the insulation film or the like, may be imparted thereto with the function of the color film. In this case, however, the resulting film must not be a type which influences the characteristics of the EL element itself (e.g. dielectric breakdown withstand voltage, luminescence brightness characteristics, life time, etc.). The TaS$_2$ film shown in the sixth embodiment is a type which is usable also as an insulation film satisfying the above-mentioned requirements by adjusting the thickness thereof.

(Seventh Embodiment)

Figure 18:
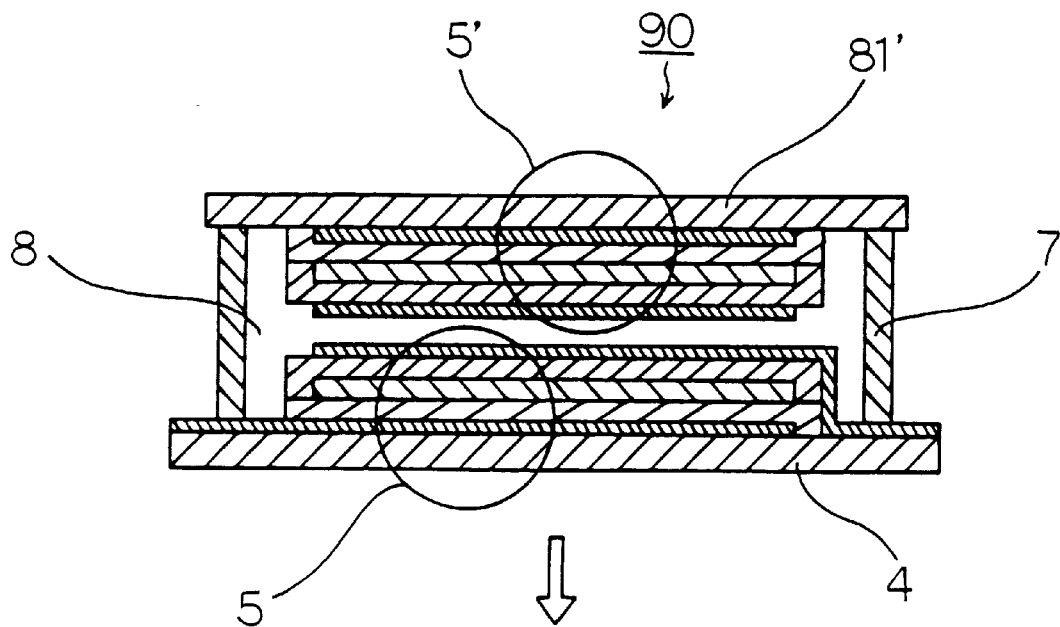
FIG. 18 is a sectional view of a seventh embodiment.

In the sixth embodiment, although explanation has been given, by way of example, regarding the transparent thin-film EL display apparatus using the color thin film, it is also possible to form the rear substrate 81 itself into a structure which functions as a color transparent body for adjusting the light transmittance. As shown in FIG. 18, the rear substrate 81 is made to be a color transparent glass 81', on which one more transparent thin-film EL element 51 is formed. With this arrangement, it is possible to obtain a transparent thin-film EL display apparatus 90 having a cross-sectional structure wherein a plurality of transparent thin-film EL elements are contained within the housing composed of the light-transmitting front substrate 4 and the color transparent glass substrate 81'.

In this structure of the transparent thin-film EL display apparatus, the transparent thin-film EL elements 5 and 5' differing from each other in luminescence color are formed, respectively, on the light-transmitting front substrate 4 and on the color transparent glass 81' which is the rear substrate, the respective thin film EL elements 5 and 5' thereof being disposed in such a manner as to face each other. By exactly overlapping the respective display regions thereof which are mirror-symmetrical in structure, it is possible to cause an occurrence of color change at the same portion. Accordingly, for example, the speed display can be made with a signalling color which changes into green, yellow, and red according to vehicle speed.

In this case as well, as mentioned above, the light transmittance of the transparent thin-film EL display apparatus is set to be from 5% to 70% inclusive, preferably from 15% to 60% inclusive, and, by means of this setting, even when external light enters from the rear, the driver can read information such as characters, figures, and the like displayed on the display section without being hampered by the external light.

In this seventh embodiment, although an example wherein the color transparent glass 81' is used as the rear substrate has been described, a half mirror may also be used as this rear substrate. In this case, the half mirror is disposed so as to transmit therethrough 5% to 70%, or preferably 15% to 65%, of light incident from the rear of the transparent thin-film EL display apparatus and thereby enable observation of the background, and to reflect the remaining light and thereby ensure the contrast of the display.

Figure 19:
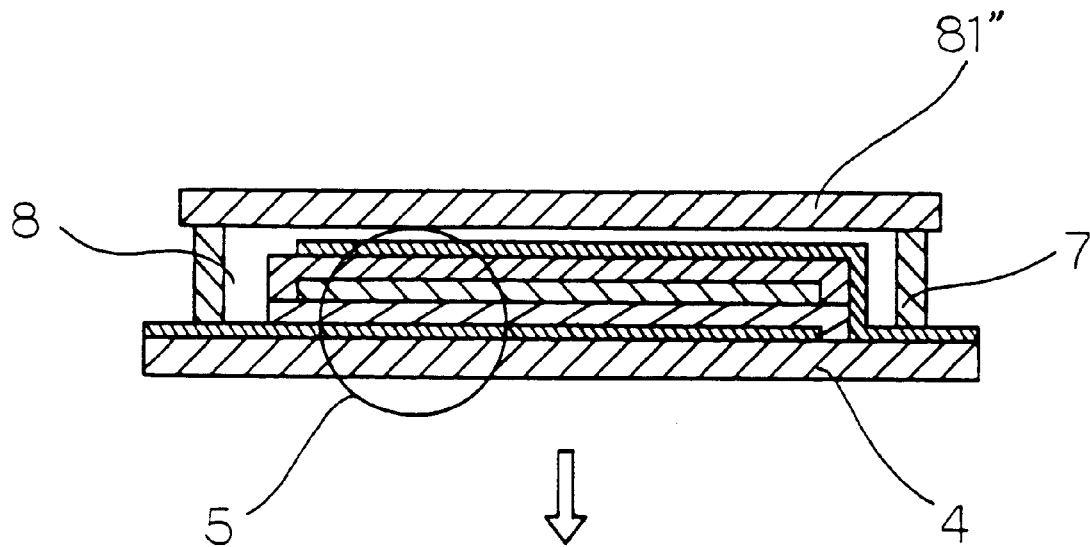
FIG. 19 is a sectional view of a modification of the sixth embodiment.

In a case where the transparent thin-film EL element is formed on the rear substrate, as in the case of the seventh embodiment and the modification thereof, it is necessary that the materials composing the color transparent glass, half mirror, etc. have required properties including heat resistance, chemical resistance, etc. and impart no obstacle in the performance of the EL element manufacture. However, in a case where the EL element is formed on only the light-transmitting front substrate, as in the case of the sixth embodiment, no inconvenience occurs even when a resin-made rear substrate 81" such as a color transparent acrylic plate or the like is used as the rear substrate (see FIG. 19). However, in this case as well, the transmittance of light incident from the rear of the transparent thin-film EL display apparatus is of course set to be from 5% to 70% inclusive or preferably from 15% to 60% inclusive.

As mentioned above, according to each of the preceding sixth and seventh embodiments, the transparent thin-film EL display apparatus is provided with the constituent elements capable of limiting the transmittance of light transmitted through the EL display apparatus to the above-mentioned preferred range. By the provision of such constituent elements, even when external light enters from the rear, it is possible to enhance the display contrast without decreasing the luminance and also to ensure the visibility of the background by a "sunglass" effect.

In the foregoing description, several embodiments and modifications of the present invention have been explained. However, the present invention is not limited to such embodiments and modifications but permits the adoption of other various modes of embodiments and modifications without departing from the subject matter of the invention.

Figure 20:
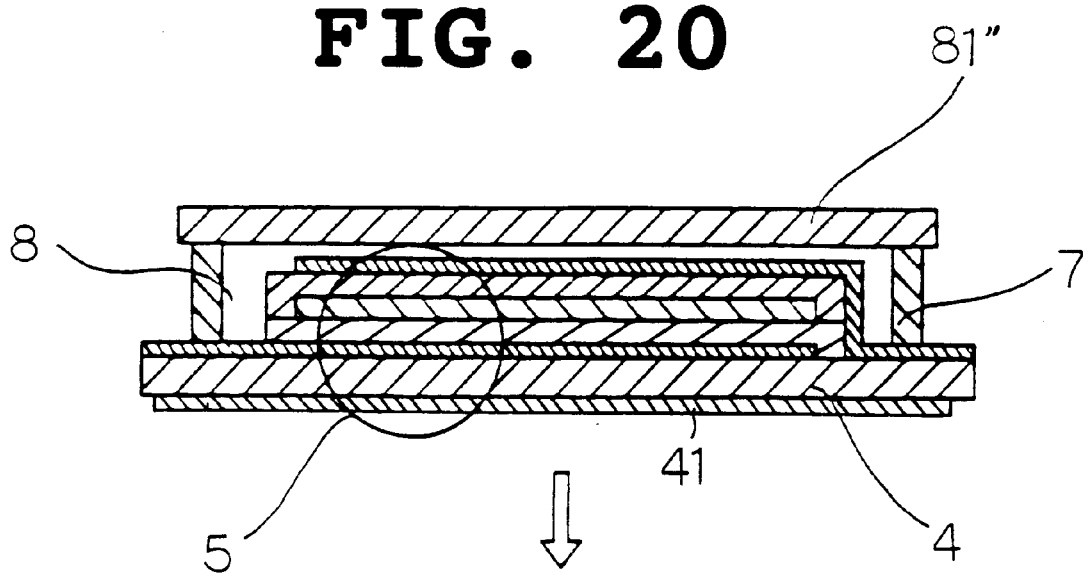
FIG. 20 is a sectional view of a modification of the represented embodiment shown in FIG. 19.

For example, regarding incident light such as an indoor illuminator lamp which is incident from the front surface side of the display apparatus, an antireflection film or an antiglare film (or antiglare sheet) 41 may be disposed on the front surface of the front substrate 4. FIG. 20 shows a cross-sectional view of a modification of the represented embodiment shown in FIG. 19. By disposing the antireflection or antiglare film 41 on the front substrate 4, it is possible to prevent superimposed images due to reflection, deterioration in contrast due to incidental light from the front surface side, etc. That is to say, the antireflection film or antiglare film (sheet) 41, which is disposed on the front face of the transparent front substrate 4, makes it possible to further improve the contrast of the display even when incident light such as an indoor illuminator, headlamp light from a vehicle travelling behind, etc., is incident from the front substrate 4 of the display apparatus.

Further, as exemplified in the above-mentioned visibility test using a comparative example, it is also possible to adopt a technique of, for example, adhering a color acrylic plate or the like to the rear face of the EL display apparatus and fixing it to this rear face.

Further, regarding the purpose of use, the display apparatus of the present invention is not limited to use as a speed display for an automobile but can also be variously used for display apparatuses including those mounted in an aircraft. In addition, the display apparatus of the present invention may be also used as a display apparatus for a personal computer or the like. As regards personal-computer display apparatuses as well, it is likely that external light enters and the display becomes hard to see according to the office where it is installed. The display apparatus of the present invention exhibits a particular effect in such an environment. Specifically, in a case where the display apparatus of the present invention is applied to a laptop type personal computer, the use thereof while an operator is moving in his vehicle or while an operator is outdoors would become comfortable.

What is claimed is:

1. A transparent thin-film EL display apparatus comprising:
    at least one thin-film EL element having at least a luminescent layer of a luminescent material and a transparent insulation layer disposed between a pair of transparent electrodes; and
    a housing for sealing said thin-film EL element, composed of a light-transmitting front substrate and a light-transmitting rear substrate, whereby display is performed through the front substrate and a background is visible through the display apparatus,
    wherein materials from which said at least one thin-film EL element and said housing are made cause a transmittance of light which is incident on a rear surface of the thin-film EL display apparatus and passes through the thin-film EL display apparatus to be in a range from 5% to 70% inclusive.

2. A transparent thin-film EL display apparatus according to claim 1, wherein said materials cause the transmittance of light which is incident on a rear surface of the thin-film EL display apparatus and passes through the thin-film EL display apparatus set to be in a range from 15% to 60% inclusive.

3. A transparent thin-film EL display apparatus according to claim 1 further comprising at least one color transparent film for obtaining said transmittance of light transmitted from the rear surface through the thin-film EL display apparatus, disposed at a position closer to the rear surface than the luminescent layer of the thin-film EL element.

4. A transparent thin-film EL display apparatus according to claim 3, wherein a hue of the color transparent film differs from a color of luminescence emitted from the thin-film EL element.

5. A transparent thin-film EL display apparatus according to claim 1 wherein the rear substrate is formed by a color transparent plate for obtaining said transmittance of light transmitted from the rear surface through the thin-film EL display apparatus.

6. A transparent thin-film EL display apparatus according to claim 5, wherein the color transparent plate is a color transparent glass or a color transparent acrylic plate.

7. A transparent thin-film EL display apparatus according to claim 5, wherein a hue of the color transparent plate differs from a color of luminescence emitted from the thin-film EL element.

8. A transparent thin-film EL display apparatus according to claim 1 wherein the rear substrate is formed by a half mirror having said transmittance for light transmitted from the rear surface through the thin-film EL display apparatus.

9. A transparent thin-film EL display apparatus according to claim 1, further comprising an antireflection film or an antiglare sheet disposed on a front surface of said light-transmitting front substrate.

* * * * *